US012327518B1

(12) United States Patent
Liu et al.

(10) Patent No.: US 12,327,518 B1
(45) Date of Patent: Jun. 10, 2025

(54) PERCEPTUAL COLOR RECOVERY FOR LUMINANCE REDUCED DISPLAYS WITH BURN-IN PROTECTION

(71) Applicant: Samsung Electronics Co., Ltd., Suwon-si (KR)

(72) Inventors: Chenguang Liu, Tustin, CA (US); Kamal Jnawali, Tustin, CA (US); Joonsoo Kim, Irvine, CA (US); Chang Su, Foothill Ranch, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/678,404

(22) Filed: May 30, 2024

Related U.S. Application Data

(60) Provisional application No. 63/604,112, filed on Nov. 29, 2023.

(51) Int. Cl.
*G09G 3/3208* (2016.01)

(52) U.S. Cl.
CPC ... *G09G 3/3208* (2013.01); *G09G 2320/0233* (2013.01); *G09G 2320/0242* (2013.01); *G09G 2320/046* (2013.01); *G09G 2360/16* (2013.01)

(58) Field of Classification Search
CPC ... G09G 2320/0233; G09G 2320/0242; G09G 2320/046; G09G 2360/16; G09G 3/3208
See application file for complete search history.

(56) References Cited

U.S. PATENT DOCUMENTS 10,129,511 B2 11/2018 Nose
10,699,674 B2 6/2020 Jeong et al.
(Continued)

FOREIGN PATENT DOCUMENTS

KR 10-2435903 B1 8/2022

OTHER PUBLICATIONS

Nayatani, Y., "Simple estimation methods for the Helmholtz-Kohlrausch effect", Color Research & Application: Endorsed by Inter-Society Color Council, The Colour Group (Great Britain), CA Society for Color, Color Science Assoc. of JP, Dutch Society for the Study of Color, The Swedish Colour Centre Foundation, Colour Society of AU, Centre Français de la Couleur, Dec. 1997, pp. 385-401, vol. 22, issue 6, Wiley Online Library {Abstract Only}.
(Continued)

*Primary Examiner* — Gene W Lee
(74) *Attorney, Agent, or Firm* — Sherman IP LLP; Kenneth L. Sherman; Steven Laut

(57) ABSTRACT

One embodiment provides a computer-implemented method that includes receiving an input image associated with a media content item. The input image includes a luminance-reduced region. One or more luminance values are obtained for a channel obtained using the input image. One or more luminance profiles of a color spectrum are generated using the one or more luminance values. Based on a visual perception effect process that is based on the one or more luminance profiles, colors associated with the luminance-reduced region are enhanced. On a display device, displaying at least the luminance-reduced region with the colors enhanced based on the visual perception effect process based on the one or more luminance profiles.

20 Claims, 10 Drawing Sheets
(9 of 10 Drawing Sheet(s) Filed in Color)

(56) References Cited

U.S. PATENT DOCUMENTS

| | | | |
|---|---|---|---|
| 11,011,101 | B2 | 5/2021 | Chang et al. |
| 11,164,540 | B2 * | 11/2021 | Holland ............... G09G 3/3208 |
| 2023/0095724 | A1 | 3/2023 | Lachine |
| 2023/0306888 | A1 | 9/2023 | Lee et al. |
| 2023/0360595 | A1 * | 11/2023 | Jnawali ..................... G06T 5/40 |

OTHER PUBLICATIONS

Shiga, T., et al., "Power Reduction of OLED Displays by Tone Mapping Based on Helmholtz-Kohlrausch Effect", IEICE Transactions on Electronics, Nov. 2017, pp. 1026-1030, vo;. E100-C, No. 11, Japan.

Nam, Y-O., et al., "Power-constrained contrast enhancement algorithm using multiscale retinex for OLED display", IEEE Transactions on Image Processing, Aug. 2014, pp. 3308-3320, vol. 23, No. 8, IEEE, United States.

* cited by examiner

305

310

1200

PERCEPTUAL COLOR RECOVERY FOR LUMINANCE REDUCED DISPLAYS WITH BURN-IN PROTECTION

CROSS-REFERENCE TO RELATED APPLICATIONS

This application claims the priority benefit of U.S. Provisional Patent Application Ser. No. 63/604,112, filed on Nov. 29, 2023, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to display imaging enhancement, and in particular, to providing enhancement of perceived contrast associated with an input image.

BACKGROUND

Screens that use organic light-emitting diode (OLED) technology currently deliver the best image quality on televisions (TVs). OLED is becoming more popular because it can show true black color, resulting in higher contrast levels than Liquid-Crystal Display (LCD). OLED screens suffer from a potential burn-in problem. Burn-in problems refer to permanent image retention on an OLED screen. It is usually caused when a static image, such as a channel logo or stationary region, stays for a longer period of time.

SUMMARY

One embodiment provides a computer-implemented method that includes receiving an input image associated with a media content item. The input image includes a luminance-reduced region. One or more luminance values are obtained for a channel obtained using the input image. One or more luminance profiles of a color spectrum are generated using the one or more luminance values. Based on a visual perception effect process that is based on the one or more luminance profiles, colors associated with the luminance-reduced region are enhanced. On a display device, displaying at least the luminance-reduced region with the colors enhanced based on the visual perception effect process based on the one or more luminance profiles.

Another embodiment includes a non-transitory processor-readable medium that includes a program that when executed by a processor provides enhancement of a visual perception effect for an input image that includes receiving, by the processor, an input image associated with a media content item. The input image includes a luminance-reduced region. The processor obtains one or more luminance values for a channel obtained using the input image. The processor further generates one or more luminance profiles of a color spectrum using the one or more luminance values. The processor additionally enhances, based on a visual perception effect process based on the one or more luminance profiles, colors associated with the luminance-reduced region. The processor further displays, on a display device, at least the luminance-reduced region with the colors enhanced based on the visual perception effect process based on the one or more luminance profiles.

Still another embodiment provides an apparatus that includes a memory storing instructions, and at least one processor executes the instructions including a process configured to receive an input image associated with a media content item. The input image includes a luminance-reduced region. One or more luminance values are obtained for a channel obtained using the input image. One or more luminance profiles of a color spectrum are generated using the one or more luminance values. Based on a visual perception effect process based on the one or more luminance profiles, colors associated with the luminance-reduced region are enhanced. On a display device, displaying at least the luminance-reduced region with the colors enhanced based on the visual perception effect process based on the one or more luminance profiles.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

Some embodiments relate generally to display image enhancement, and in particular to providing enhancement of a visual perception effect for an input image. One embodiment provides a computer-implemented method that includes receiving an input image associated with a media content item. The input image includes a luminance-reduced region. One or more luminance values are obtained for a channel obtained using the input image. One or more luminance profiles of a color spectrum are generated using the one or more luminance values. Based on a visual perception effect process that is based on the one or more luminance profiles, colors associated with the luminance-reduced region are enhanced. On a display device, displaying at least the luminance-reduced region with the colors enhanced based on the visual perception effect process based on the one or more luminance profiles.

Figure 1:
FIG. 1 is an example illustrating difference between an organic light-emitting diode (OLED) display and a Liquid Crystal Display (LCD)

FIG. 1 is an example illustrating difference between an organic light-emitting diode (OLED) display and a Liquid Crystal Display (LCD). Screens that use OLED technology currently deliver the best image quality on TVs. OLED is becoming more popular because it can show true black color, resulting in higher contrast levels than LCD. For example, display 110 (galaxy) represents the superiority of OLED display technology over display 110 LCD technology.

Figure 2:
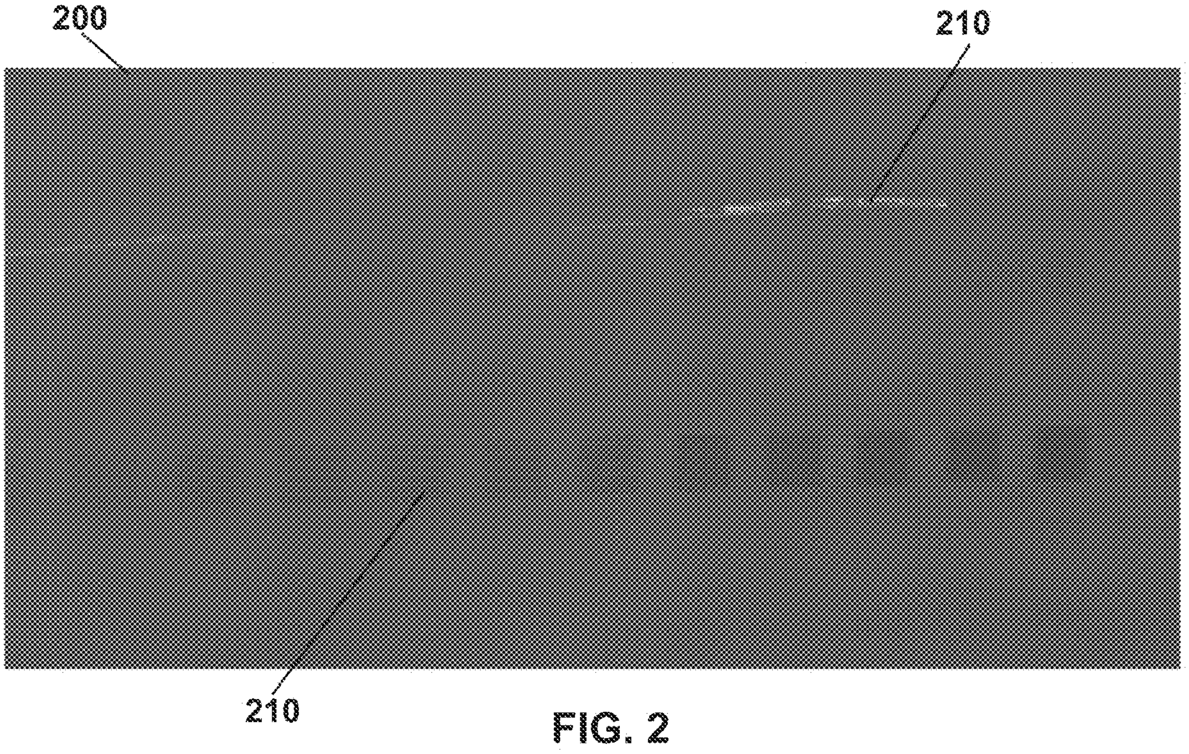
FIG. 2 illustrates an example of image retention on a screen due to a longer exposure of a logo in the same region.

FIG. 2 illustrates an example of image retention on a screen 200 due to a longer exposure of a logo in the same region. OLED screens suffer from a potential burn-in problem. Burn-in problems refer to permanent image retention on an OLED screen. Burn-in is usually caused when a static image, such as a channel logo or stationary region, stays for a longer period of time. The burn-in problem generally remains as a ghostly background no matter what else appears on-screen, such as in screen 200 where burn-in remnants 210 may be seen. The permanent retention of a logo is due to the permanent damage to individual OLED pixels. This creates visually unpleasant images. Employing a luminance reduction algorithm/processing to prevent burn-in by reducing the luminance on a channel logo or stationary region can extend the life of OLED TVs without compromising visual qualities.

Figure 3A:
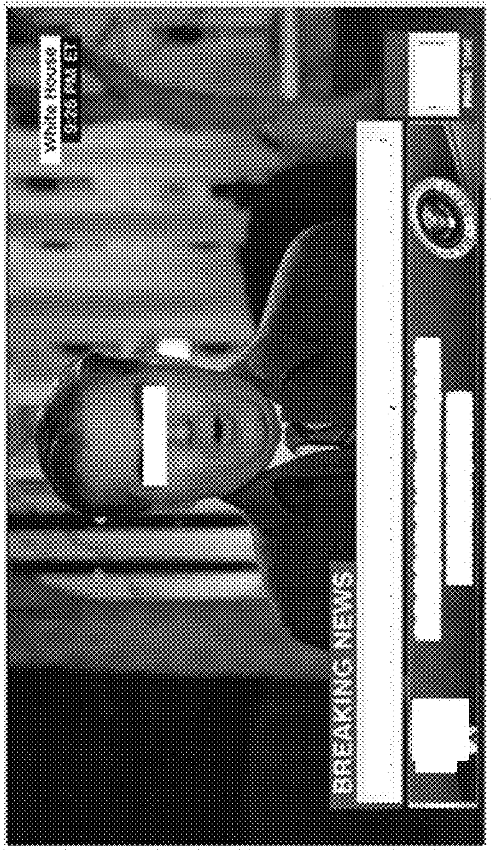
FIGS. 3A-B illustrate a color shift when a luminance reduction algorithm is applied.
Figure 3B:
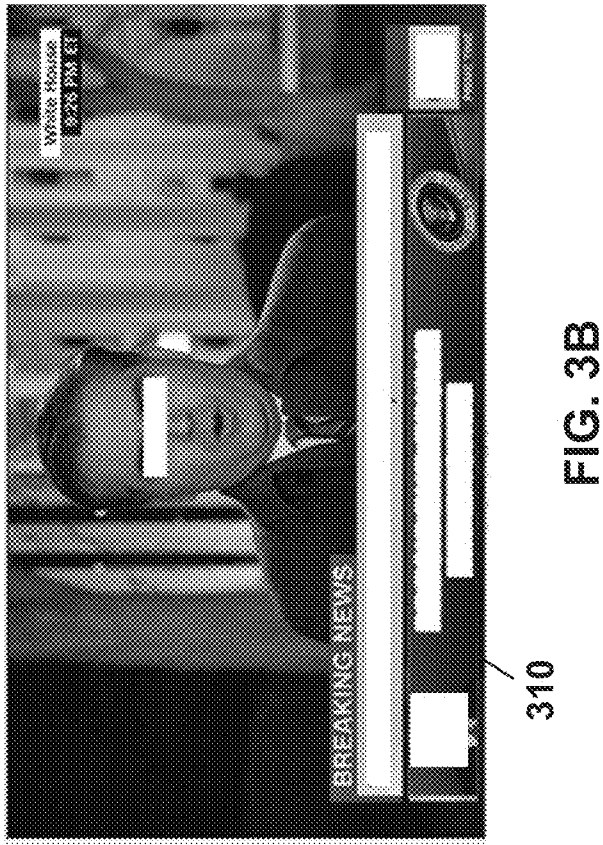

FIGS. 3A-B illustrate a color shift when a luminance reduction algorithm is applied. The luminance reduction algorithm introduces a color shift from, as shown in FIG. 3B in region 310 as compared to region 305 in FIG. 3A. The color shift in FIG. 3B in region 310 occurs when the luminance reduction algorithm is applied to region 305 in FIG. 3A. The luminance reduction algorithm is used to extend the life of an OLED screen by preventing burn-in. However, the use of luminance reduction can introduce a hue shift. To recover color while maintaining the same level of luminance assigned by the luminance reduction algorithm, the disclosed technology provides a perceptual phenomenon (PP) effect (e.g., Helmholtz-Kohlrausch (HK)-based effect, visual perception effect, etc.) color enhancement approach (e.g., process, method, etc.) to preserve perceptually similar colors close to the original image. One or more embodiments provide a PP effect based color enhancement approach to generate perceptually brighter colors on a luminance-reduced (a logo or static) region. Some embodiments provide a hardware-friendly PP effect based color enhancement process or algorithm by creating multiple (e.g., three, etc.) look up tables (LUTs) corresponding to each channel (red, green, blue) at multiple level of luminance levels.

Figure 4:
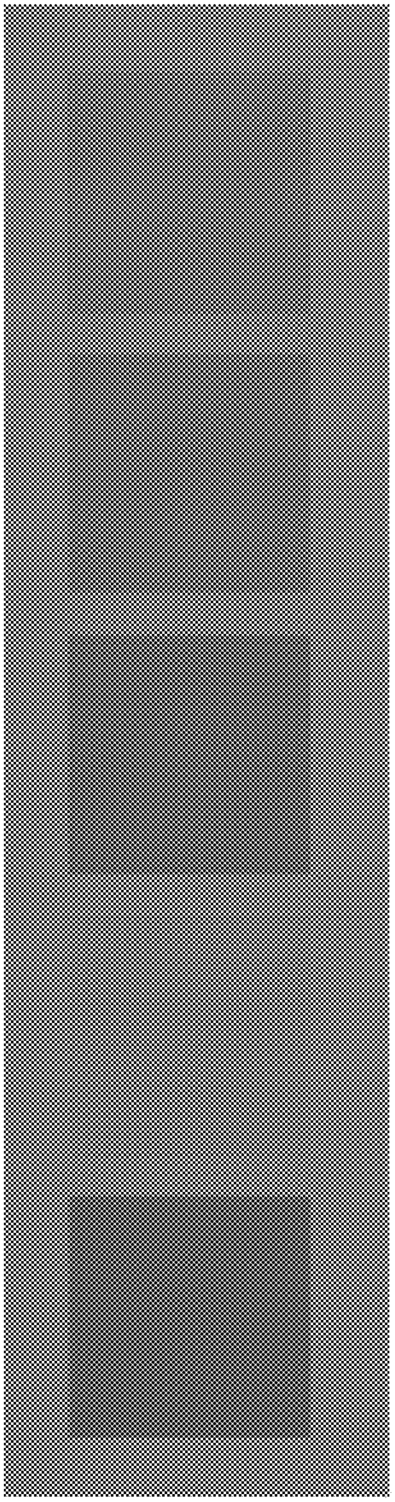
FIG. 4 illustrates an example of a perceptual phenomenon (PP) effect (e.g., the Helmholtz-Kohlrausch (HK) effect)

FIG. 4 illustrates an example of a PP effect (e.g., the HK effect, etc.). The PP effect, such as an HK effect, etc., is a visual phenomenon in which the saturation of the color is perceived as a part of the color's luminance. In other words, the lightness perceived by the eyes increases with increase in chroma, even though the physical lightness is preserved. The HK effect suggests saturated color looks brighter to the human visual system. Assume that each color patch produces 1000 lux. If red and green colors are mixed, then a mix of the two together produces 2000 lux and should look two times as bright as the individual (red and green) colors. However, that is not the case. In the same way, if red, green and blue are mixed, then a mix of all three together produces 3000 lux and should look three times as bright as the individual colors. However, that is also not the case. In the example of FIG. 4, the red color looks perceptually brighter compared to the yellow color. Experimental luminance records on red and yellow patches are 132 and 290, respectively.

Figure 5:
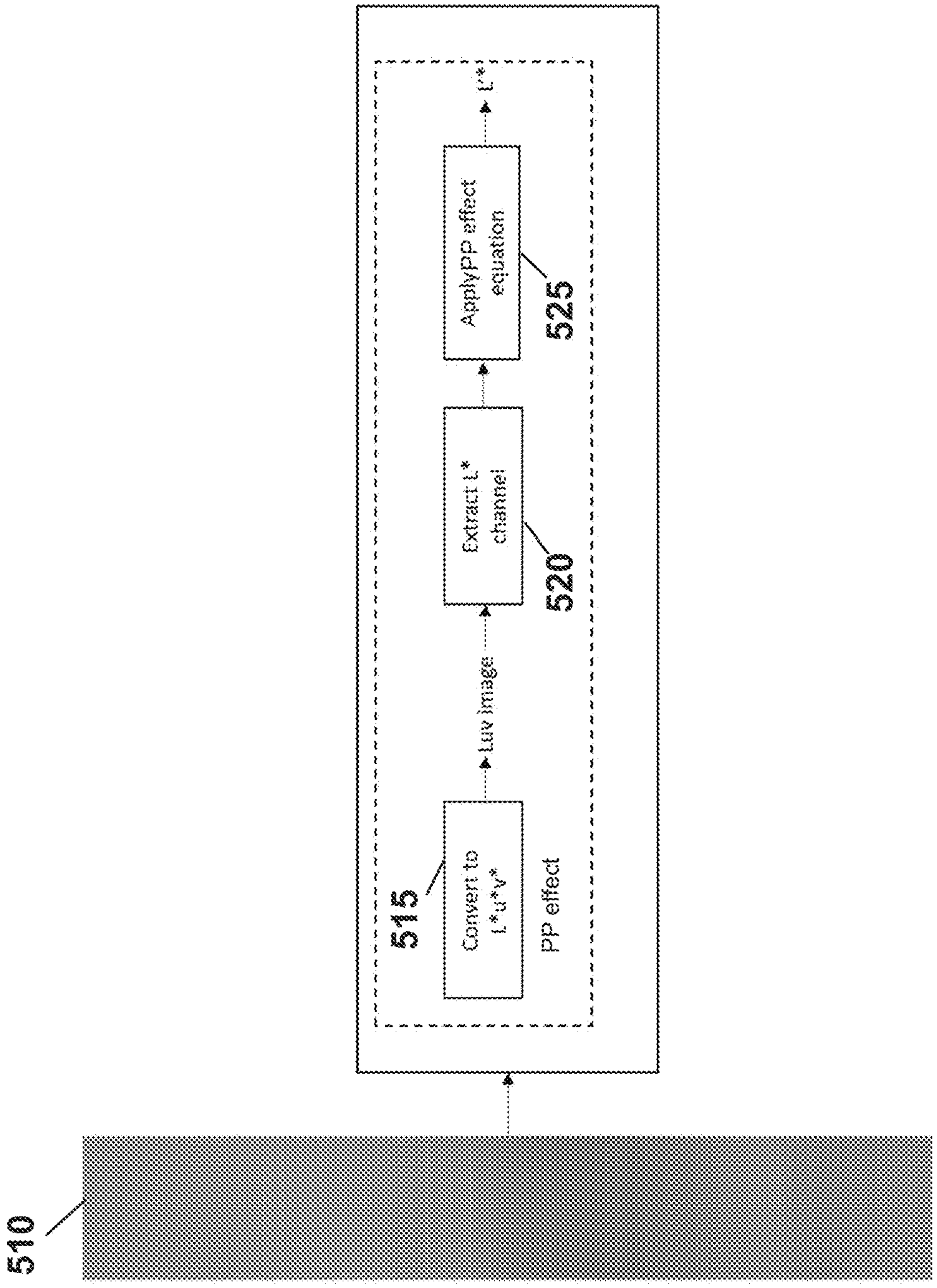
FIG. 5 illustrates an example of showing the spectrum sent to a PP effect block (e.g., an HK effect block, etc.) to generate an L (lightness) channel profile, according to some embodiments.

FIG. 5 illustrates an example of showing the spectrum 510 sent to a PP effect block (e.g., an HK effect block, etc.) to generate an L (luminance) channel profile, according to some embodiments. Red, green, and blue (RGB) color space or RGB color system construct all the color from the combination of red, green, and blue colors as per trichromatic theory. One or more embodiments create a color spectrum image 510 that covers the entire RGB-domain luminance at L, and use the spectrum image 510 to estimate the luminance using a PP-based color enhancement process/algorithm. As shown, the spectrum image 510 is input to the PP effect block. In block 515, the image based on the spectrum image 510 is converted to an L* u* v* color space (or CIELUV (International Commission on Illumination (CIE)) image, where L stands for luminance, and U and V represent chromaticity values of color images. The Luv image is provided to block 520 where processing extracts the L* channel of the image. In block 525 the processing applies a PP effect equation and outputs L'* as the luminance profile.

Figure 6:
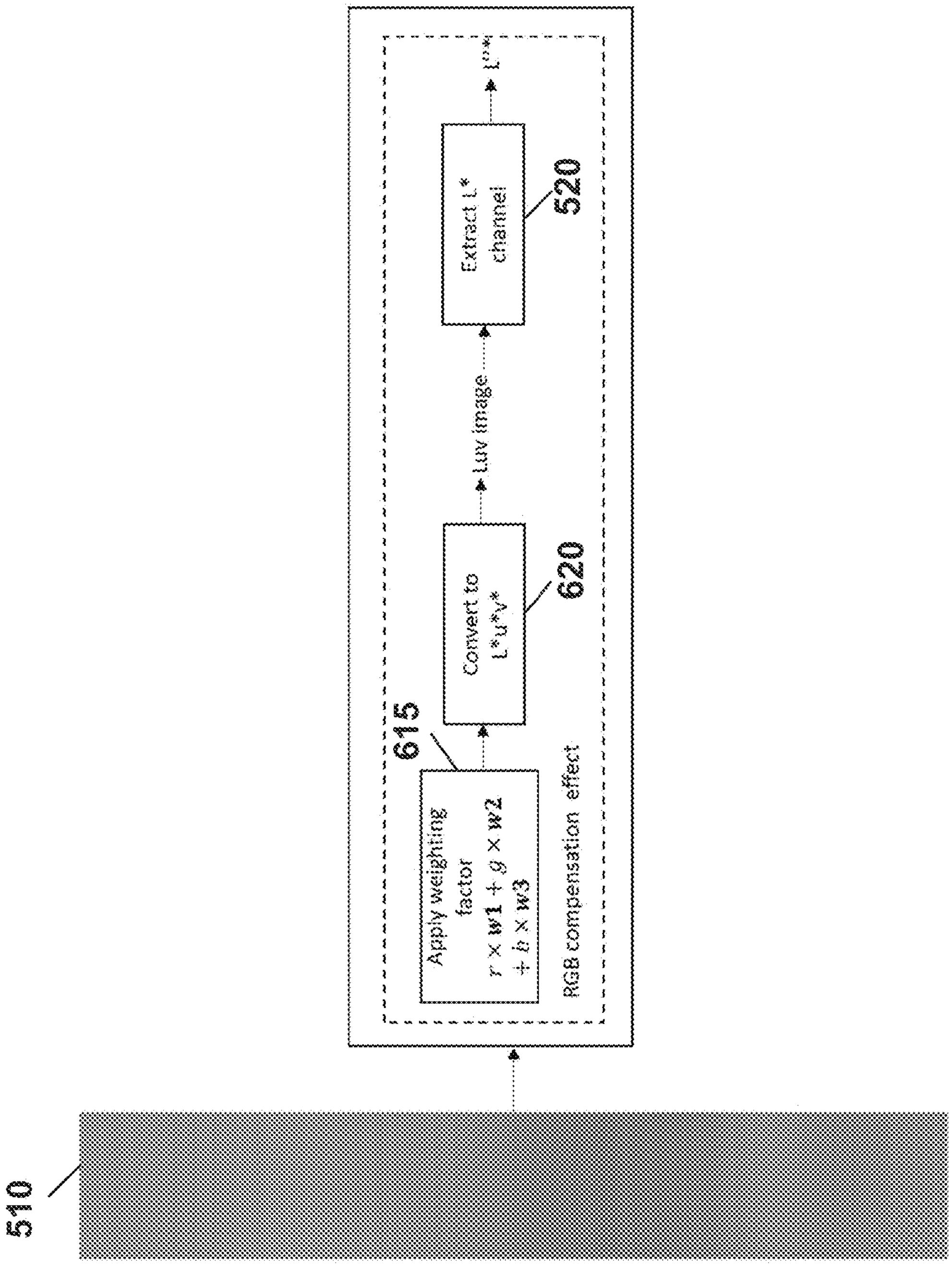
FIG. 6 illustrates an example of how a hardware-friendly process/algorithm tracks a logo/static region over an entire frame, according to some embodiments.

FIG. 6 illustrates an example of how a hardware-friendly process/algorithm tracks a logo/static region over an entire frame, according to some embodiments. In one or more embodiments, the spectrum image 510 is sent to the RGB compensation block 615 where multiple weighting factors $w_1$, $w_2$, and $w_3$ are applied. The L" luminance profile was compared against the PP effect generated L' profile to estimate optimal weighting factors corresponding to red, green, and blue channels. Some embodiments use an estimated optimal set of weighting factors at multiple luminance levels. The result of the RGB compensation block 615 is provided to block 620 that provides a conversion to the L* u* v* color space, resulting in a Luv based image. In block 520 the processing extracts the L* channel of the image. One or more embodiments use a PP based equation (Eq. 1) to generate luminance profile of the color spectrum image 510.

$$L_{new}=L_{old}+[-0.1340\times q(\theta)+0.0872\times K_{Br}]\times S_{uv}\times L_{old} \quad \text{Eq. 1}$$

where $L_{new}$ and $L_{old}$ are the luminance value after the PP effect, and before the PP effect respectively, and $$q(\theta) = -0.01585 - 0.03017\cos\theta - 0.04556\cos 2\theta - 0.02667\cos 3\theta - 0.00295\cos 4\theta + 0.14592\sin\theta + 0.05084\sin 2\theta - 0.01900\sin 3\theta - 0.00764\sin 4\theta$$

$$K_{Br} = 02717\times\frac{\left(6.469 + 6.362\times L_a^{0.4495}\right)}{\left(6.469 + L_a^{0.4495}\right)}$$

$$S_{cv}(x, y) = 13\left[(u' - u'_c)^2 + (v' - v'_c)^2\right]$$

Figure 7A:
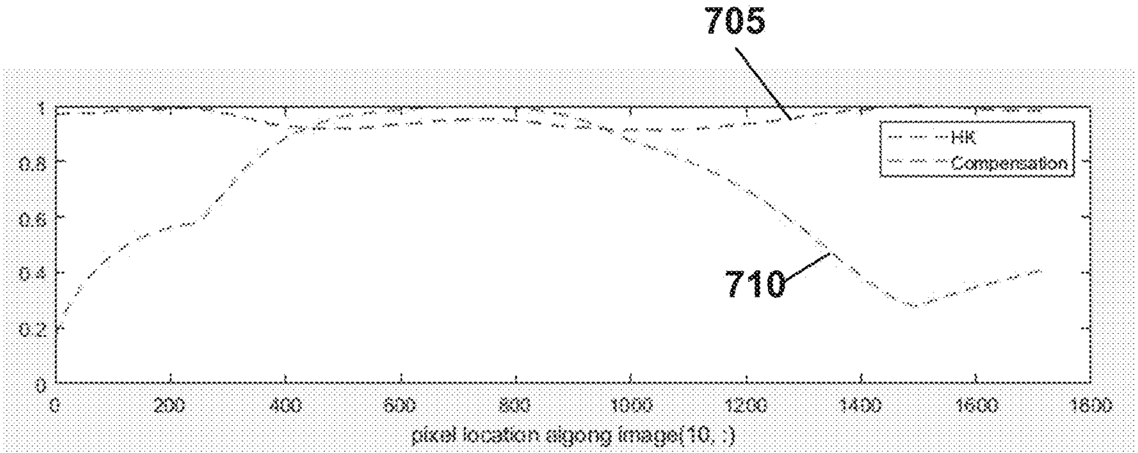
FIG. 7A illustrates a plot corresponding to a PP effect (dashed blue line) and the compensated PP effect (dashed red line) generated using $w_1$, $w_2$, $w_3$ coefficients corresponding to the red, green, and blue (RGB) channels, according to some embodiments.
Figure 7B:
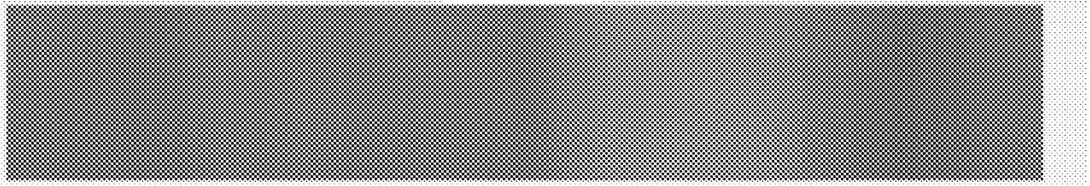
FIG. 7B illustrates the spectral image.
Figure 7C:
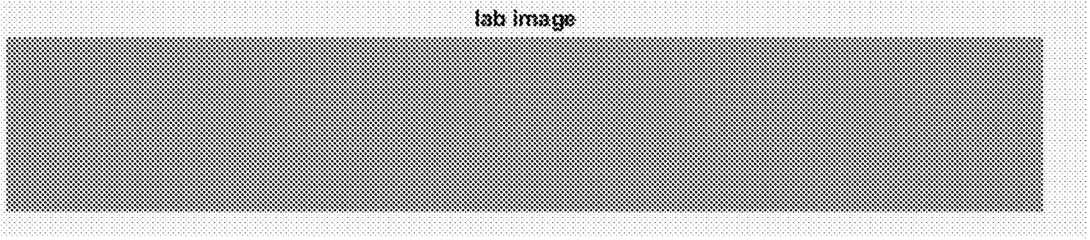
FIG. 7C illustrates a luminance image of the RGB image.

FIG. 7A illustrates a plot corresponding to a PP effect 705 (dashed blue line) and the compensated PP effect 710 (dashed red line) generated using $w_1$, $w_2$, $w_3$ coefficients corresponding to the RGB channels, according to some embodiments. FIG. 7B illustrates the spectral image. FIG. 7C illustrates a luminance image of the RGB image. Note that the physical luminance of the spectral RGB image is the same across the spectrum, as verified by the lab image of the CIELAB color space (referred to as L*a*b*, which is a color space defined by the International Commission on Illumination (abbreviated CIE) and expresses color as three values: L* for perceptual lightness and a* and b* for the four unique colors of human vision: red, green, blue and yellow). Note that, to make the PP effect more effective, a higher compensation is given to the red channel, which maintains a higher perceptual luminance than the green channel at the same luminance.

In some embodiments, $w_1$, $w_2$, and $w_3$ are selected such that the PP effect becomes more prominent on the red, and blue spectra, and less on the green spectrum, and these values are estimated at six levels of luminance (0, 0.1, 0.3, 0.6, 0.9, and 1). In FIG. 7C, the image (as a reference) is used to show that every color in the spectral image of FIG. 7B has perceptually the same luminance value.

Figure 8C:
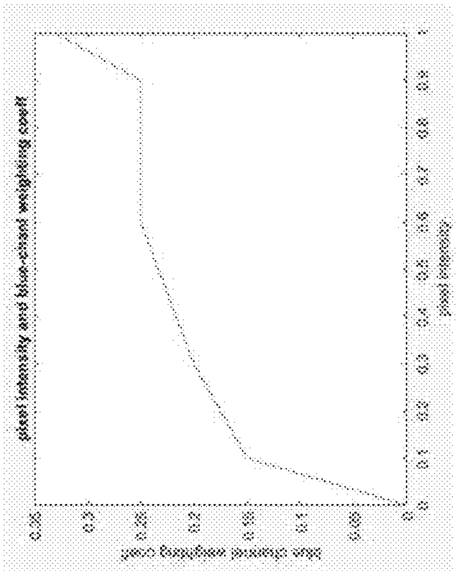
FIGS. 8A-C illustrate the six points of red-channel, green-channel, and blue-channel weighting factors at intensity levels of 0, 0.10, 0.30, 0.60, 0.9, and 1, respectively, according to some embodiments.
Figure 8B:
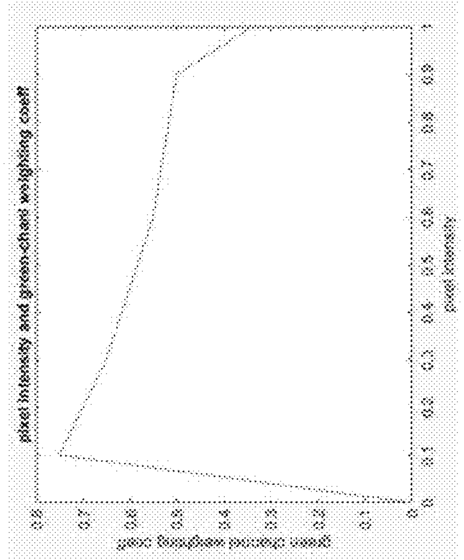
Figure 8A:
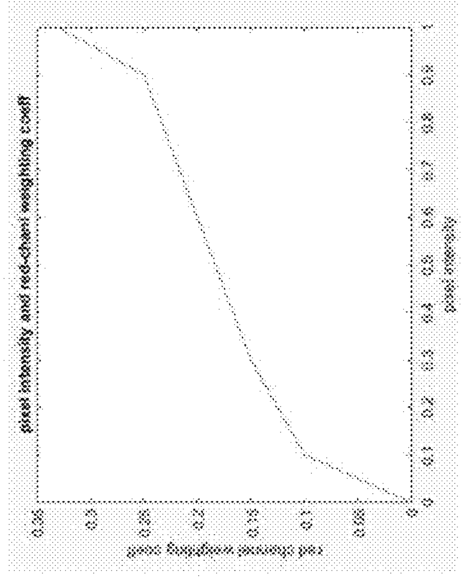

FIGS. 8A-C illustrate the six points of red-channel, green-channel, and blue-channel weighting factors at intensity levels of 0, 0.10, 0.30, 0.60, 0.9, and 1, respectively, according to some embodiments. The three-channel weighting factors are estimated at the six levels of luminance and generated the LUT. The weighting factors at six levels of luminance are stored in a register. All channels have the same weighting factors in the range of 0.9 to 1.0, this is because the PP effect process is not applied to pixels not corresponding to a luminance-reduced region. In one or more embodiments, except for the range of 0.9 to 1.0, the higher weighting factor is given to the green channel and the lesser weighting factor to the red and blue channels. These weighting factors are used to generate the PP-based compensated image with the following equation (Eq. 2)

$$HK_{compensated\ image}=w_1\times R+w_2\times G+w_3\times B \quad \text{Eq. 2}$$

Figure 9:
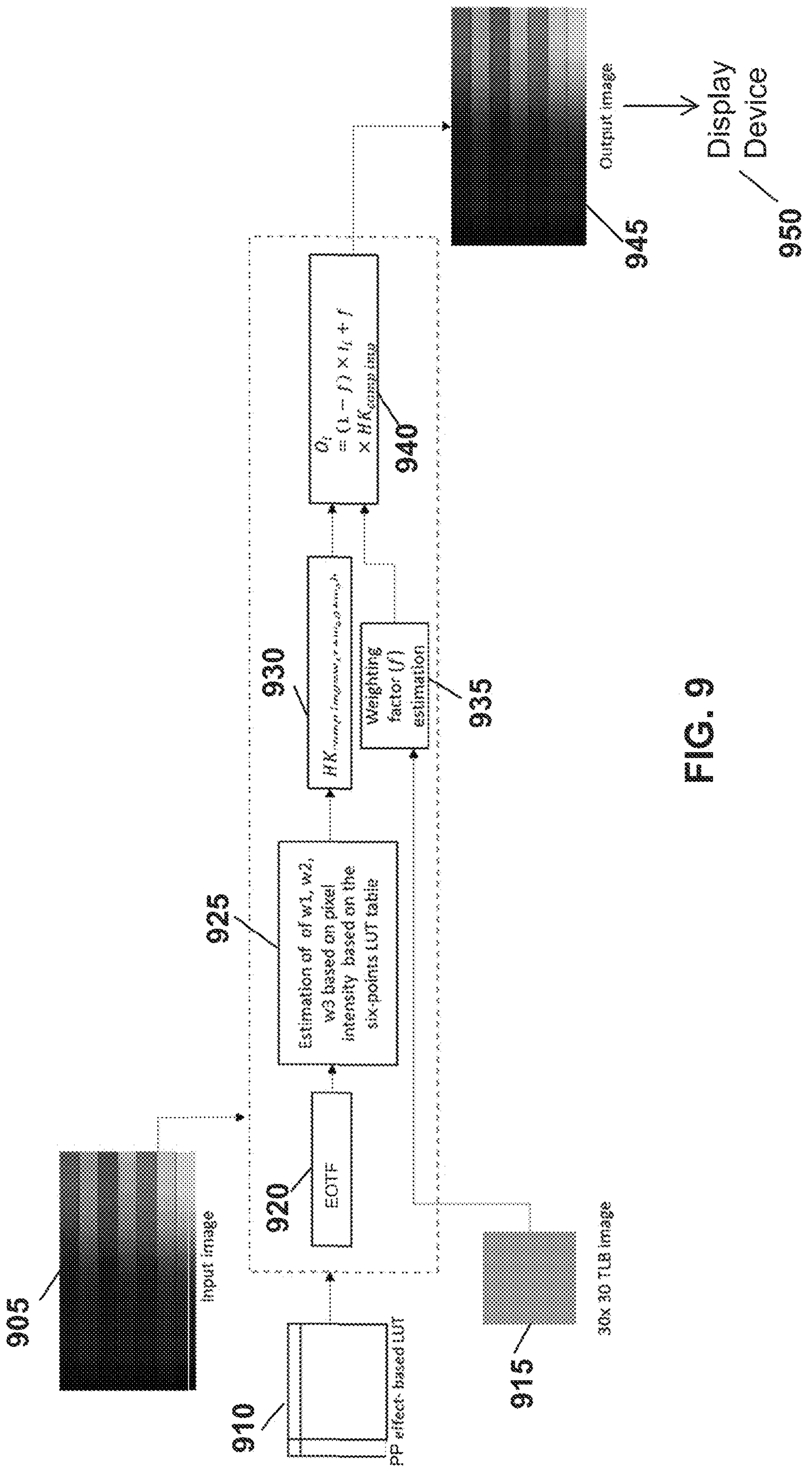
FIG. 9 illustrates an example of a hardware-friendly implementation of a PP effect-based process for color enhancement, according to some embodiments.

FIG. 9 illustrates an example of a hardware-friendly implementation of a PP effect-based process for color enhancement, according to some embodiments. In one or more embodiments, the three-channel weighting factors are estimated at the six levels of luminance and generate the LUT 910 used by the RGB compensation block (indicated by the dashed box) as well as the input image 905. The weighting factors at six levels of luminance are stored in a register. Block 920 is an Electro-Optical Transfer Function (EOTF). The result of block 920 is provided to block 925, where the estimation of the multiple weighting factors $w_1$, $w_2$, and $w_3$ are based on pixel intensity on the six levels of luminance LUT 910. The result of block 925 is provided to block 930 the determines the result of Eq. 2. The result of block 930 and block 935, which is provided with a 30×30 TLB (translation lookaside buffer) image 915, are provided to block 940 that determines the appropriate result for providing the output image 945, which is displayed on a display device 950 (e.g., TVs, monitors, smart phones, wearable devices, tablets, laptops, automotive displays, virtual reality (VR) displays, augmented reality (AR) displays, headset displays, digital cameras and camcorders, medical device displays, etc.).

In some embodiments, when an image passes to the PP-based process/algorithm, the three factors used in Eq. 2 are used to generate a PP compensated lightness image. The L" luminance profile is compared against the PP effect generated L' profile to estimate optimal weighting factors corresponding to red, green, and blue channels. Eq. 1 is utilized to generate the luminance profile of a color spectrum. The optimal set of weighting factors are estimated at multiple luminance levels.

Figure 10:
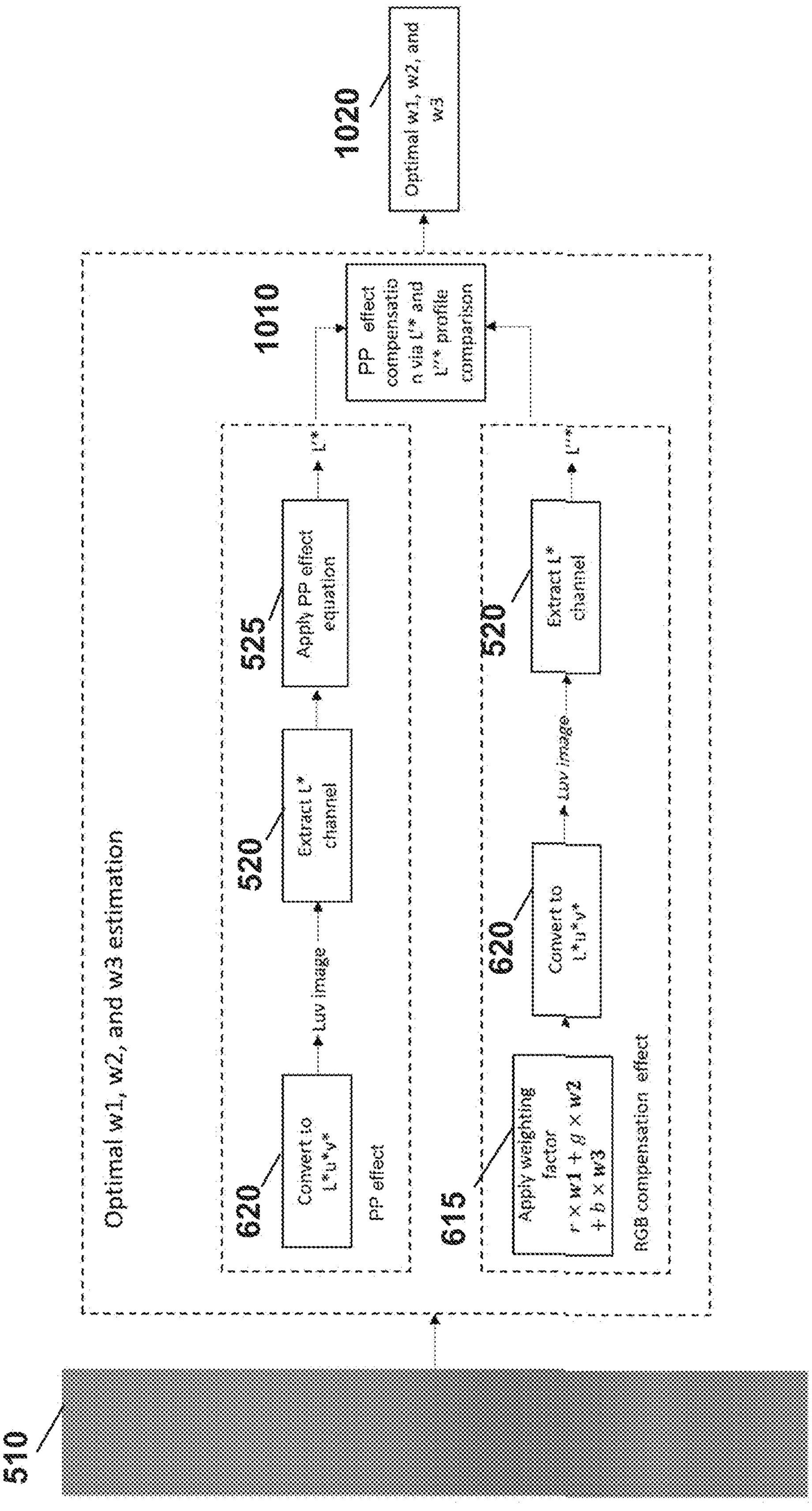
FIG. 10 illustrates a block diagram of a process for optimal r, g, and b weight estimation at multiple luminance levels, according to some embodiments.

FIG. 10 illustrates a block diagram of a process for optimal r, g, and b weight estimation at multiple luminance levels, according to some embodiments. The optimal r, g, and b weights are estimated at multiple luminance levels (0, 0.1, 0.3, 0.6, 0.9, 1) using a PP-effect model, and then the linear interpolation processing is used to estimate weighting factors within the range of 0 to 1. The optimal weights are estimated at five intensity levels using Eq. 2. Note that the upper block (PP effect) uses the PP effect Eq. 1 to the spectrum image 510 to generate the luminance profile along the entire column of the image, and the lower block (RGB compensation effect) fine-tunes the $w_1$, $w_2$, and $w_3$ values to generate the luminance profile until the compensated PP effect is satisfied based on the two luminance profiles. As shown, the spectrum image 510 is provided to both upper and lower blocks in FIG. 10. In the PP effect block (upper) 620 converts the spectrum image 510 to L*u*v* resulting in a Luv image. The Luv image is provided to block 520 that extracts the L* channel. The L* channel is provided to block 525 that applies the PP effect equation (Eq. 1) to result in the L'* profile. In the RGB compensation block (lower), in the RGB compensation block 615, multiple weighting factors $w_1$, $w_2$, and $w_3$ are applied. The resulting Luv image of the RGB compensation block 615 is provided to block 520 where processing extracts the L* channel of the image resulting in the L"* profile. The L'* and the L"* profiles are provided to block 1010 where the PP effect compensation is determined by a comparison of the L'* profile and the L"* profile, which results in the optimal $w_1$, $w_2$, and $w_3$ values at block 1020.

Figure 11:
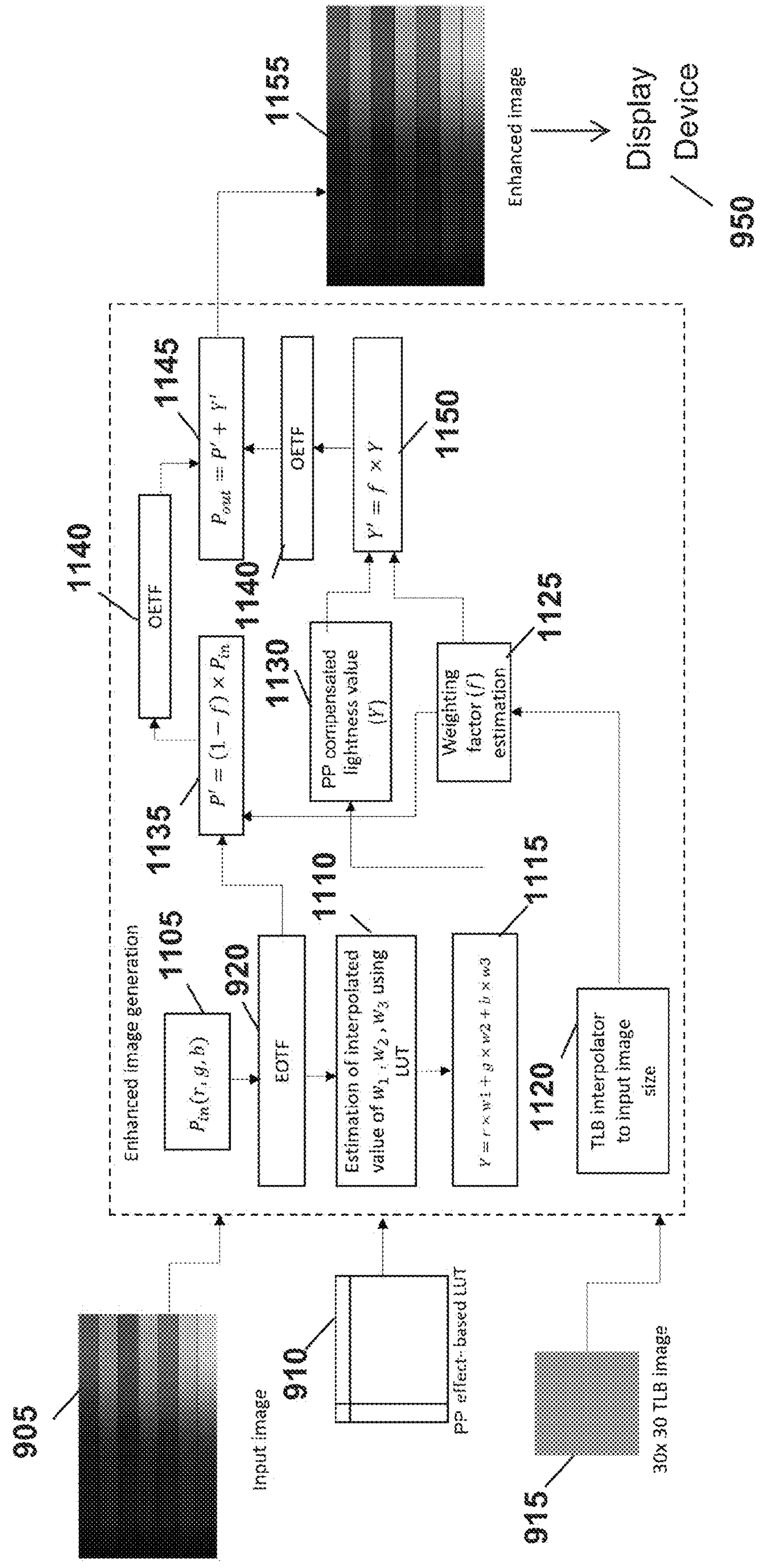
FIG. 11 illustrates a block diagram of a hardware-friendly implementation of a PP effect-based process/algorithm for color enhancement, according to some embodiments.

FIG. 11 illustrates a block diagram of a hardware-friendly implementation of a PP effect-based process/algorithm for color enhancement, according to some embodiments. The input image 905, the LUT 910 and the 30×30 TLB image 915 are provided to the enhanced image generation block. In block 1105, the input image is converted to $P_{in}$ (r, g, b) 1105 and is processed by block 920 that performs the EOTF. The result from block 920 is provided to block 1110 and 1135. In block 1110 the estimation if the interpolated values of the weighting factors $w_1$, $w_2$, and $w_3$ are determined using the PP effect based LUT 910. The result of block 1110 are provided to block 1115 to determine the result of $Y=r\times w_1+g\times w_2+b\times w_3$, which is provided to block 1130. Block 1120 provides a TLB interpolator to the input image size. The result of block 1120 is provided to block 1125 that estimates a weighting factor (f), and provides the result to block 1135. In block 1135 processing determines the result of $P'=(1-f)\times P_{in}$ based on the results provided from blocks 920 and 1125. The result from block 1135 is provided to block 1140 where an opto-electronic transfer function (OETF) is performed. The result of blocks 1125 and 1130 are provided to block 1150 that determines the result of $Y'=f\times Y$. The result of block 1150 is provided to block 1140 where processing determines the result of another block 1140 that performs the OETF. The results from both OETF blocks 1140 are provided to block 1145, which determines the result of $P_{out}=P'+Y'$. The result of block 1145 is the enhanced image 1155, which is provided to a display device 950 (e.g., TVs, monitors, smart phones, wearable devices, tablets, laptops, automotive displays, virtual reality (VR) displays, augmented reality (AR) displays, headset displays, digital cameras and camcorders, medical device displays, etc.).

Figure 12:
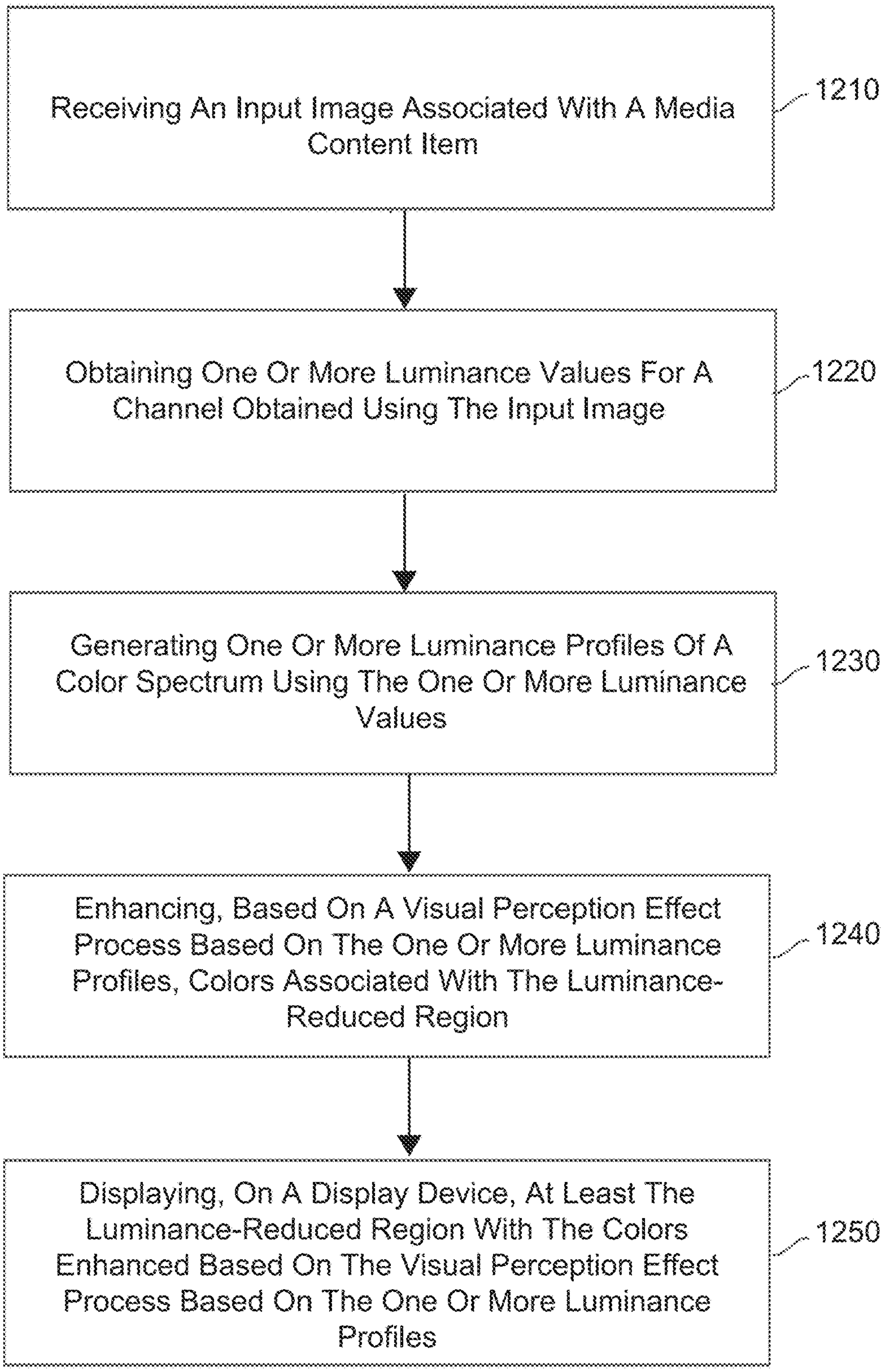
FIG. 12 illustrates a process for enhancement of a visual PP effect for an input image, according to some embodiments.

FIG. 12 illustrates a (computing) process 1200 for enhancement of a visual PP effect for an input image, according to some embodiments. In block 1210, process 1200 receives an input image (e.g., input image 905, FIG. 9) associated with a media content item, where the input image includes a luminance-reduced region (e.g., that is displayed on a display device (e.g., televisions, smart phones, wearable devices, tablets, laptops, automotive displays, VR displays, AR displays, headset displays, digital cameras and camcorders, medical device displays, etc.)). In block 1220, process 1200 obtains one or more luminance values for a channel obtained using the input image. In block 1230, process 1200 generates one or more luminance profiles of a color spectrum using the one or more luminance values. In block 1240, process 1200 enhances, based on a visual perception effect (e.g., HK effect, etc.) process based on the one or more luminance profiles, colors associated with the luminance-reduced region. In block 1250, process 1200 displays, on a display device (e.g., display device 950, FIGS. 9 and 11).

In some embodiments, process 1200 further includes the feature that the luminance-reduced region comprises a logo or static region.

In one or more embodiments, process 1200 additionally includes the feature that the enhancement of the colors associated with the luminance-reduced region results in perceptually brighter colors associated with the luminance-reduced region.

In some embodiments, process 1200 provides the feature that the perceptually brighter colors on the luminance-reduced region minimize perceptual color degradation due to a luminance reduction process applied for device display burn-in protection and power saving.

In one or more embodiments, process 1200 additionally includes the feature that the visual perception effect process comprises a HK effect process.

In some embodiments, process 1200 further includes the feature of creating LUTs corresponding to each color channel of the luminance-reduced region at multiple level of luminance levels.

In one or more embodiments, process 1200 additionally includes the feature that higher compensation is provided to a red channel of the luminance reduced region to maintain a higher perceptual luminance than a green channel of the luminance reduced region at a same luminance value.

One or more embodiments provides a PP effect based color enhancement process to generate perceptually brighter color on a luminance-reduced region to minimize the perceptual color degradation due to a luminance reduction algorithm used for various purposes including OLED burn-in protection, power saving, etc. Some embodiments provide a hardware-friendly PP effect based process or algorithm to enhance color on the luminance reduced region. One or more embodiments additionally provide a way to generate static LUTs used for PP effect modeling, which greatly saves the computational cost on hardware components.

In one or more embodiments, the disclosed technology provides a modeling of the PP effect for perceived color improvement while preserving and/or reducing power consumption at the same time. The PP effect, such as an HK effect, etc., is a visual phenomenon in which the saturation of the color is perceived as a part of the color's luminance. In other words, the lightness perceived by the eyes increases with increase in chroma, even though the physical lightness is preserved.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:

receiving an input image associated with a media content item, wherein the input image includes a luminance-reduced region;

obtaining one or more luminance values for a channel obtained using the input image;

generating one or more luminance profiles of a color spectrum using the one or more luminance values;

enhancing, based on a visual perception effect process based on the one or more luminance profiles, colors associated with the luminance-reduced region; and displaying, on a display device, at least the luminance-reduced region with the colors enhanced based on the visual perception effect process based on the one or more luminance profiles.

2. The method of claim 1, wherein the luminance-reduced region comprises a logo or static region.

3. The method of claim 1, wherein the enhancement of the colors associated with the luminance-reduced region results in perceptually brighter colors associated with the luminance-reduced region.

4. The method of claim 3, wherein the perceptually brighter colors on the luminance-reduced region minimize perceptual color degradation due to a luminance reduction process applied for device display burn-in protection and power saving.

5. The method of claim 1, wherein the visual perception effect process comprises a Helmholtz-Kohlrausch (HK) effect process.

6. The method of claim 5, further comprising:

creating look up tables (LUTs) corresponding to each color channel of the luminance-reduced region at multiple level of luminance levels.

7. The method of claim 1, wherein higher compensation is provided to a red channel of the luminance reduced region to maintain a higher perceptual luminance than a green channel of the luminance reduced region at a same luminance value.

8. A non-transitory processor-readable medium that includes a program that when executed by a processor provides enhancement of a visual perception effect for an input image, comprising:

receiving, by the processor, an input image associated with a media content item, wherein the input image includes a luminance-reduced region;

obtaining, by the processor, one or more luminance values for a channel obtained using the input image;

generating, by the processor, one or more luminance profiles of a color spectrum using the one or more luminance values;

enhancing, by the processor, based on a visual perception effect process based on the one or more luminance profiles, colors associated with the luminance-reduced region; and displaying, by the processor, on a display device, at least the luminance-reduced region with the colors enhanced based on the visual perception effect process based on the one or more luminance profiles.

9. The non-transitory processor-readable medium of claim 8, wherein the luminance-reduced region comprises a logo or static region.

10. The non-transitory processor-readable medium of claim 8, wherein the enhancement of the colors associated with the luminance-reduced region results in perceptually brighter colors associated with the luminance-reduced region.

11. The non-transitory processor-readable medium of claim 10, wherein the perceptually brighter colors on the luminance-reduced region minimize perceptual color degradation due to a luminance reduction process applied for device display burn-in protection and power saving.

12. The non-transitory processor-readable medium of claim 8, wherein the visual perception effect process comprises a Helmholtz-Kohlrausch (HK) effect process.

13. The non-transitory processor-readable medium of claim 12, further comprising:

creating look up tables (LUTs) corresponding to each color channel of the luminance-reduced region at multiple level of luminance levels.

14. The non-transitory processor-readable medium of claim 8, wherein higher compensation is provided to a red channel of the luminance reduced region to maintain a higher perceptual luminance than a green channel of the luminance reduced region at a same luminance value.

15. An apparatus comprising:

a memory storing instructions; and at least one processor that executes the instructions including a process configured to:

receive an input image associated with a media content item, wherein the input image includes a luminance-reduced region;

obtain one or more luminance values for a channel obtained using the input image;

generate one or more luminance profiles of a color spectrum using the one or more luminance values;

enhance, based on a visual perception effect process based on the one or more luminance profiles, colors associated with the luminance-reduced region; and display, on a display device, at least the luminance-reduced region with the colors enhanced based on the visual perception effect process based on the one or more luminance profiles.

16. The apparatus of claim 15, wherein the luminance-reduced region comprises a logo or static region.

17. The apparatus of claim 15, wherein the enhancement of the colors associated with the luminance-reduced region results in perceptually brighter colors associated with the luminance-reduced region.

18. The apparatus of claim 17, wherein the perceptually brighter colors on the luminance-reduced region minimize perceptual color degradation due to a luminance reduction process applied for device display burn-in protection and power saving.

19. The apparatus of claim 15 wherein the visual perception effect process comprises a Helmholtz-Kohlrausch (HK) effect process.

20. The apparatus of claim 15, further comprising:

creating look up tables (LUTs) corresponding to each color channel of the luminance-reduced region at multiple level of luminance levels;

wherein higher compensation is provided to a red channel of the luminance reduced region to maintain a higher perceptual luminance than a green channel of the luminance reduced region at a same luminance value.

* * * * *